(12) United States Patent
Furue et al.

(10) Patent No.: US 7,361,389 B2
(45) Date of Patent: Apr. 22, 2008

(54) SMECTIC LIQUID CRYSTAL DEVICE AND PROCESS FOR PRODUCING THE SAME

(75) Inventors: Hirokazu Furue, Sashima-gun (JP); Hiroshi Yokoyama, Tsukuba (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 121 days.

(21) Appl. No.: 10/562,673

(22) PCT Filed: Aug. 8, 2003

(86) PCT No.: PCT/JP03/10103

§ 371 (c)(1),
(2), (4) Date: Dec. 29, 2005

(87) PCT Pub. No.: WO2005/008325

PCT Pub. Date: Jan. 27, 2005

(65) Prior Publication Data
US 2007/0114490 A1    May 24, 2007

(30) Foreign Application Priority Data
Jul. 18, 2003  (JP)  ............................. 2003-276462

(51) Int. Cl.
*C09K 19/52* (2006.01)
*C09K 19/38* (2006.01)
*G02F 1/1333* (2006.01)

(52) U.S. Cl. .................... 428/1.1; 252/299.01; 349/93; 349/188

(58) Field of Classification Search ................. 428/1.1; 252/299.01; 349/167, 171, 177, 93, 188
See application file for complete search history.

(56) References Cited

U.S. PATENT DOCUMENTS

| 5,594,569 A | 1/1997 | Konuma et al. |
| 6,108,061 A * | 8/2000 | Sako et al. ................... 349/85 |

FOREIGN PATENT DOCUMENTS

| JP | 4-268389 | 9/1992 |
| JP | 2000-147510 | 5/2000 |
| JP | 2003-195032 | 7/2003 |
| JP | 2003-213265 | 7/2003 |

* cited by examiner

*Primary Examiner*—Shean C Wu
(74) *Attorney, Agent, or Firm*—Oblon, Spivak, McClelland, Maier & Neustadt, P.C.

(57) ABSTRACT

A smectic liquid crystal device and process for producing the same are provided to realize uniform orientation of a smectic liquid crystal with no nematic phase in a phase sequence represented by an antiferroelectric liquid crystal; and a process for producing the same. The process comprises the steps of inducing an isotropic phase-nematic phase-smectic phase as a phase sequence of mixture obtained by adding a photopolymerizable monomer liquid crystal exhibiting nematic phase to a smectic liquid crystal; and irradiating the mixture with UV rays so that the monomer is photopolymerized into a polymer to thereby form a smectic liquid crystal medium with uniform orientation structure.

7 Claims, 6 Drawing Sheets

(a) (b)

55°C (Iso.→N)

(c) (d)

50°C (N)   36°C (SmA)

(a) →+UV (36°C)→ (b)

(a) 40°C (SmA) → heat → (b) 60°C (Iso) → cool → (c) 40°C (SmA)

(a)

(b)

(c)

75 °C (SmA)

60 °C (SmC$_A$*)

SMECTIC LIQUID CRYSTAL DEVICE AND PROCESS FOR PRODUCING THE SAME

TECHNICAL FIELD

The present invention relates to a smectic liquid crystal device and process for producing the same.

BACKGROUND ART

Recently, ferroelectric liquid crystal and antiferroelectric liquid crystal with spontaneous polarization have been attracting attention (see non-patent document 1 below) because they have various characteristics such as allowing liquid crystal displays to display beautiful moving images. However, it is much more difficult to obtain a uniform orientation in the smectic liquid crystal represented by the ferroelectric liquid crystal and antiferroelectric liquid crystal than the nematic liquid crystal widely used for liquid crystal displays because they have a layered structure in their molecular orientation.

Further, it is said that several tens of thousands of antiferroelectric liquid crystal have been synthesized up till now. However, not one with the nematic phase in a phase sequence has been found yet. It is much more difficult to obtain the uniform orientation structure than the ferroelectric liquid crystal with the nematic phase in a phase sequence.

In this situation, the present inventors have reported the polymer-stabilized ferroelectric liquid crystal with polymer having a liquid crystal structure introduced in the ferroelectric liquid crystal (see non-patent document 2 below).

Meanwhile, effective conventional art to realize a uniform orientation of liquid crystals include the thermal gradient method, magnetic field application orientation method and shear stress application method (see, for example, non-patent document 3 below). However, they are not simple methods because they require special device configuration and devices.

[Patent document 1] Japanese Unexamined Patent Publication No. 2003-98553 (pp.2-3, FIG. 1)
[Non-patent document 1] A. D. L. Chandani et al.: Jpn. J. Appl. Phys., 28, L1261 (1989)
[Non-patent document 2] H. Furue et al.: Jpn. J. Appl. Phys., 36, L1517 (1997)
[Non-patent document 3] Liquid crystal handbook, ed. by Editorial board of liquid crystal handbook, p. 248, Maruzen

DISCLOSURE OF INVENTION

FIG. 1 is a schematic diagram of a method to obtain a uniform molecular orientation structure in a conventional smectic liquid crystal phase. FIG. 2 shows the problems of the related art.

In order to obtain a uniform molecular orientation structure in the smectic liquid crystal phase, it is important to, at first, as shown in FIG. 1(a), transform the isotropic phase (Iso.) into the nematic phase (N) as shown in FIG. 1(b) by lowering the temperature to form a uniform molecular orientation, then, as shown in FIGS. 1(c) and (d), to transform it to the smectic phase (SmA and SmC).

However, when the isotropic phase (Iso.) directly transforms into the smectic phase (SmA and SmC) as the antiferroelectric liquid crystal does, the molecular orientation and layered structure formation occur simultaneously. Therefore, the disorder of orientation caused in the process of generation and growth of nuclei of the liquid crystal domain occurring in the isotropic phase (Iso.) is fixed by the layered structure formation and a medium with disordered molecular orientation as shown in FIG. 2 is obtained (In the nematic phase, the uniform orientation area expands accompanying the growth of the liquid crystal domain because re-orientations of molecules easily occur).

In view of the above problems of the related art, an object of the present invention is to provide a smectic liquid crystal device and process for producing the same to realize the uniform orientation of the smectic liquid crystal with no nematic phase in the phase sequence represented by the antiferroelectric liquid crystal.

In order to achieve the object shown above, the present invention provides the following:

[1] A manufacturing method of a smectic liquid crystal device, including the steps of: (a) inducing the isotropic phase-nematic phase-smectic phase as a phase sequence of a mixture obtained by adding a photopolymerizable monomer liquid crystal exhibiting nematic phase to a smectic liquid crystal; and (b) irradiating the mixture with UV rays so that the monomer is photopolymerized into a polymer to thereby form a smectic liquid crystal medium with a uniform orientation structure.

[2] The manufacturing method of the smectic liquid crystal device of [1] shown above, wherein a polymer functions as a template to memorize and stabilize the orientation structure in the step (b), and a smectic liquid crystal medium with a uniform orientation structure which is completely the same as that before phase transformation, even if transforming into an isotropic phase after the step (b) shown above is performed, is obtained directly from the isotropic phase.

[3] The smectic liquid crystal device manufactured by the manufacturing methods of the smectic liquid device of [1] or [2] shown above.

More specifically,

[4] The manufacturing method of the smectic liquid crystal device of [1] shown above, characterized in that the smectic liquid crystal is 4-cyano-4'-dodecylbiphenyl and added with the monomer liquid crystal exhibiting the photopolymerizable nematic phase in an amount of 30% by weight.

[5] The smectic liquid crystal device of [3] shown above, including a liquid cell structure having upper and lower glass substrates with rubbing orientation films formed.

[6] The smectic liquid device of [5] shown above configured so that the rubbing direction of the rubbing orientation films is the same between the upper and lower glass substrates.

[7] The smectic liquid crystal device of [5] shown above in which the cell gap of the liquid crystal is 2 μm.

The present invention can exert effects as follows:

(1) A uniform orientation of a smectic liquid crystal with no nematic phase in the phase sequence represented by the antiferroelectric liquid crystal is realized.

(2) A polymerized smectic liquid crystal device having a smectic liquid crystal medium with a uniform molecular orientation structure is obtained in an easy manner.

(3) A polymer functions as a template that memorizes and stabilizes the orientation structure, and a smectic liquid crystal medium with a uniform orientation structure which is completely the same as that before phase transformation, even if transforming into an isotropic phase is performed, can be obtained directly from the isotropic phase.

BEST MODE FOR CARRYING OUT THE INVENTION

A uniform orientation of a smectic liquid crystal with no nematic phase in a phase sequence represented by an antiferroelectric liquid crystal, from which a smectic liquid crystal device having a smectic liquid medium with a polymerized and uniform molecular orientation can be provided, is realized.

The manufacturing consists of a process to induce an isotropic phase-nematic phase-smectic phase as a phase sequence of mixture obtained by adding a photopolymerizable monomer liquid crystal exhibiting a nematic phase to a smectic liquid crystal, and a process to irradiate the mixture with UV rays so that the monomer is photopolymerized into a polymer to thereby form a smectic liquid crystal medium with uniform orientation structure.

EXAMPLE 1

Embodiments according to the present invention will now be explained.

First, the principle of the present invention will be explained.

An appropriate amount of photopolymerized monomer liquid crystal is added to a smectic liquid crystal. This monomer liquid crystal shall indicate a nematic phase. The mixing ratio is adjusted to induce the isotropic phase-nematic phase-smectic phase as a phase sequence of a mixture. In other words, a smectic liquid crystal medium with uniform molecular orientation is obtained if a phase sequence of isotropic phase-nematic phase-smectic phase is induced in the mixture. The smectic phase in this case may not be an antiferroelectric liquid crystal (rather, an antiferroelectric liquid crystal does not appear in this smectic phase because, generally, the nematic phase and antiferroelectric liquid crystal phase do not coexist with each other in the same phase sequence).

Then, UV light is irradiated on the mixture to photopolymerize and polymerize a monomer and induce a phase separation between a liquid crystal and a polymer. As a result of the phase separation, the liquid crystal returns to the original phase sequence because it is the original composition. Finally, mainly depending on the amount of monomer added, a smectic liquid crystal medium with uniform orientation is obtained if a disorder of orientation accompanying polymerization does not occur. The present invention is also characterized in that the uniform orientation structure is strongly stabilized by introducing a polymer network.

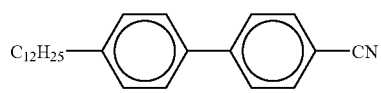

[Formula 1]

As an example, an experimental result in a system where a photopolymerized monomer liquid crystal UCL-001 (Dainippon Ink And Chemicals, Incorporated) in an amount of 30% by weight is added to 4-cyano-4'-dodecylbiphenyl will now be explained. In the liquid crystal cell structure used in the experiment, a rubbing orientation film of polyimide RN-1199 (Nissan Chemical Industries, Ltd.) is formed on a glass substrate and the rubbing directions are so configured that they are in the same direction on the upper and lower substrates.

Figure 5:
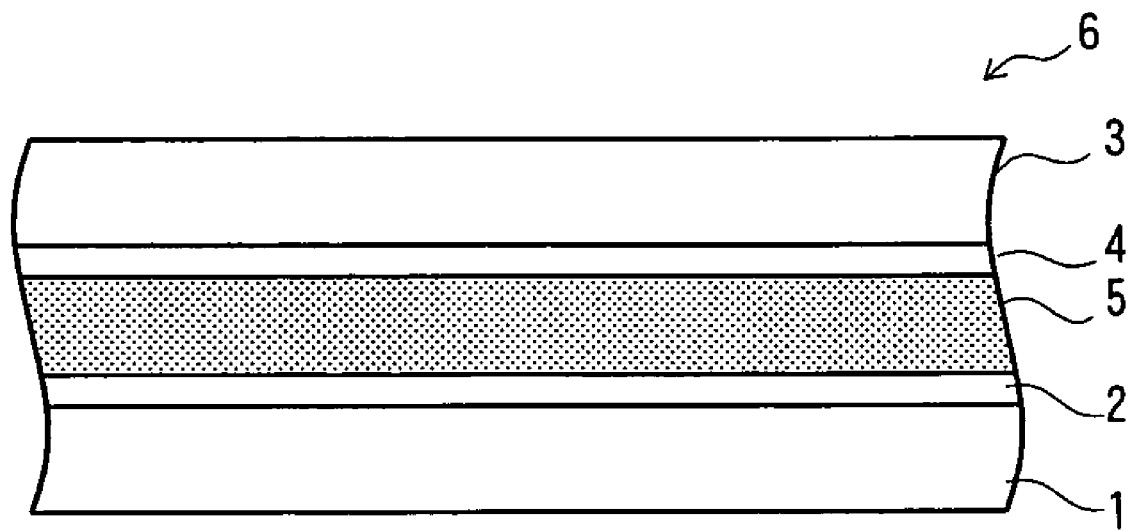
FIG. 5 is a diagram showing the structure of a smectic liquid crystal device that shows an embodiment according to the present invention.

FIG. 5 is a diagram showing the structure of a smectic liquid crystal device that shows an embodiment according to the present invention.

The smectic liquid crystal device has a lower glass substrate 1, a rubbing orientation film 2 formed on a lower glass substrate 1, an upper glass substrate 3, a rubbing orientation film 4 formed under the upper glass substrate 3, a smectic liquid crystal 5 polymerized according to the present invention having a liquid medium with a uniform molecular structure, and a liquid crystal cell 6.

In this configuration, for example, the rubbing orientation films 2 and 4 of the upper and lower glass substrates 1 and 3, respectively, are configured so that the rubbing orientation of the rubbing orientation films 2 and 4 is aligned in the same direction. The gap of the liquid crystal cell 6 is 2 μm.

Figure 1:
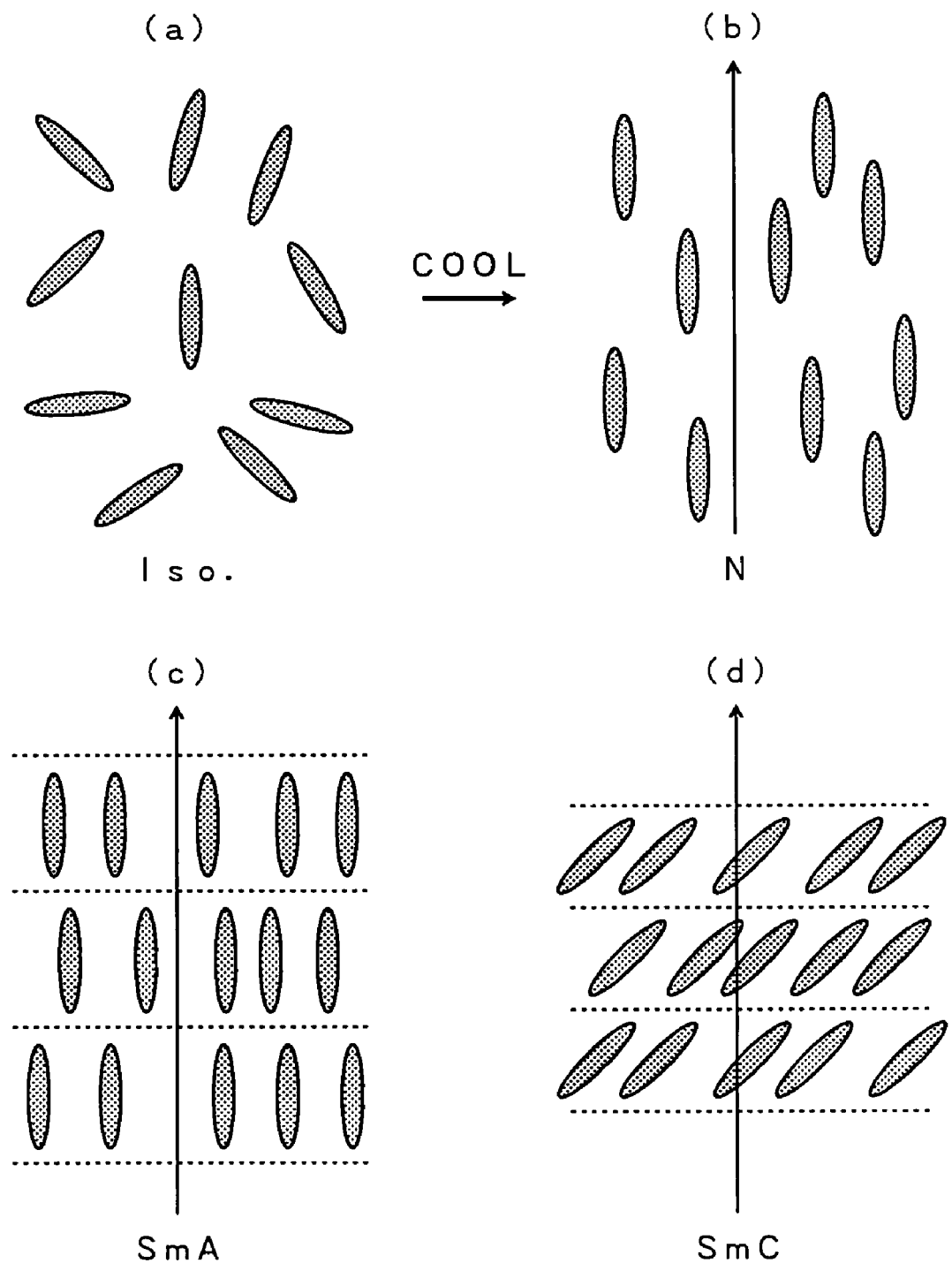
FIG. 1 is a schematic diagram of a method to obtain a uniform molecular orientation structure in a conventional smectic liquid crystal phase.
Figure 2:
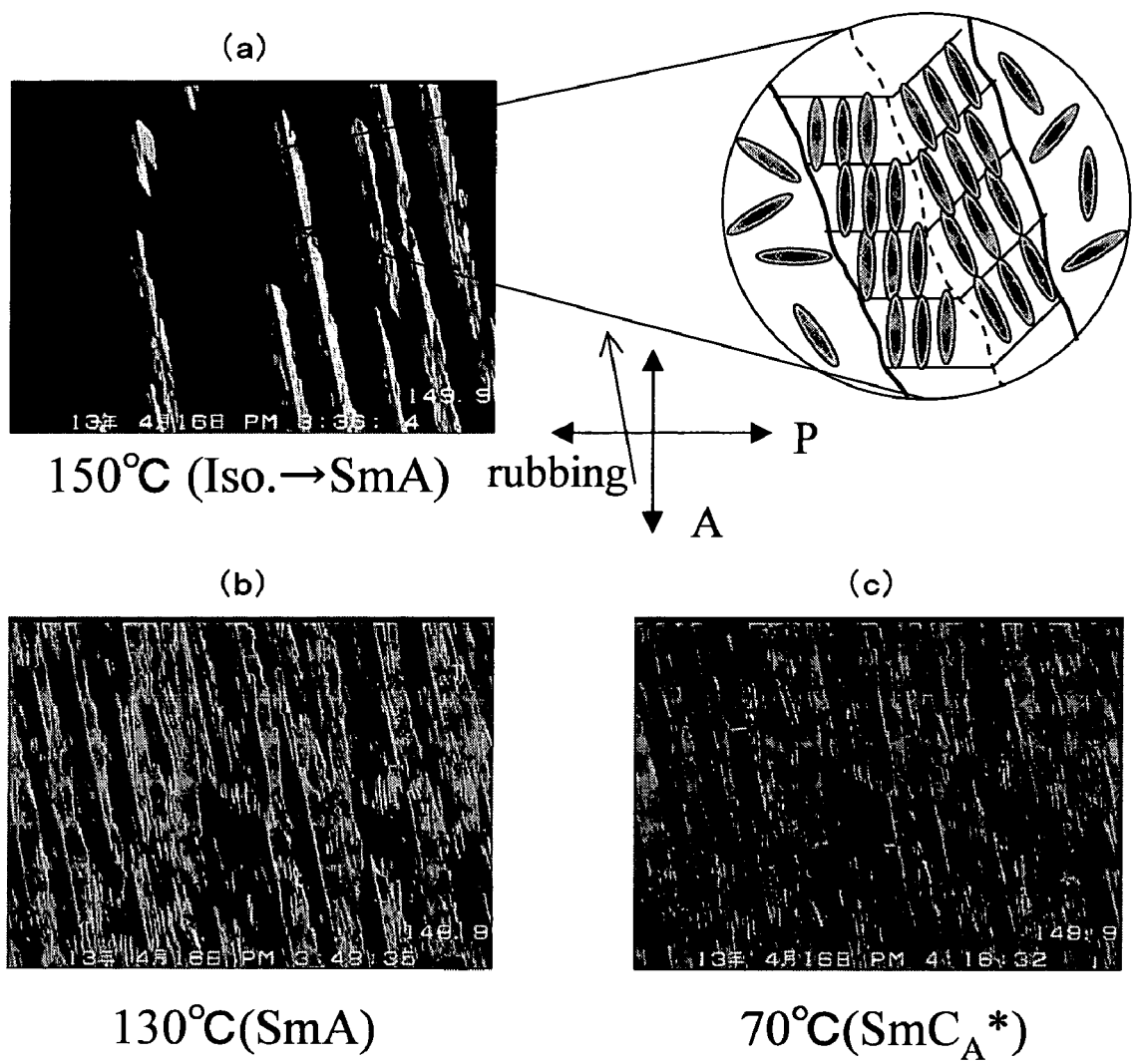
FIG. 2 shows problems of the related art.
Figure 3:
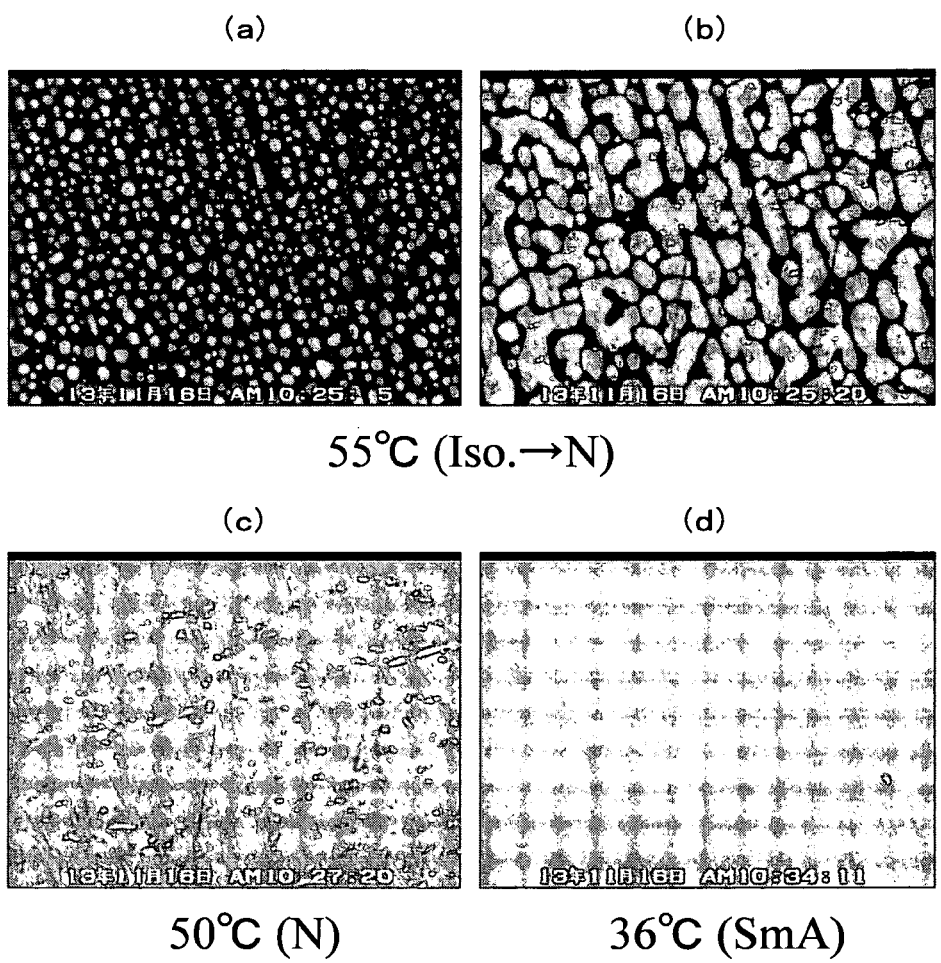
FIG. 3 shows a texture and thermal changes after adding a monomer liquid crystal to a smectic liquid crystal of the present invention.

FIG. 3 shows the texture and thermal changes after adding a monomer liquid crystal.

(1) First, in the temperature lowering process, a transfer from an isotropic phase [FIG. 3(a): 55° C.] to a nematic phase [FIG. 3(b), then FIG. 3(c): 50° C.], then a transformation to a smectic phase [FIG. 3(d): 36° C.] are observed. A smectic liquid crystal medium with uniform molecular orientation is obtained because the liquid crystal goes through a nematic phase.

Figure 4:
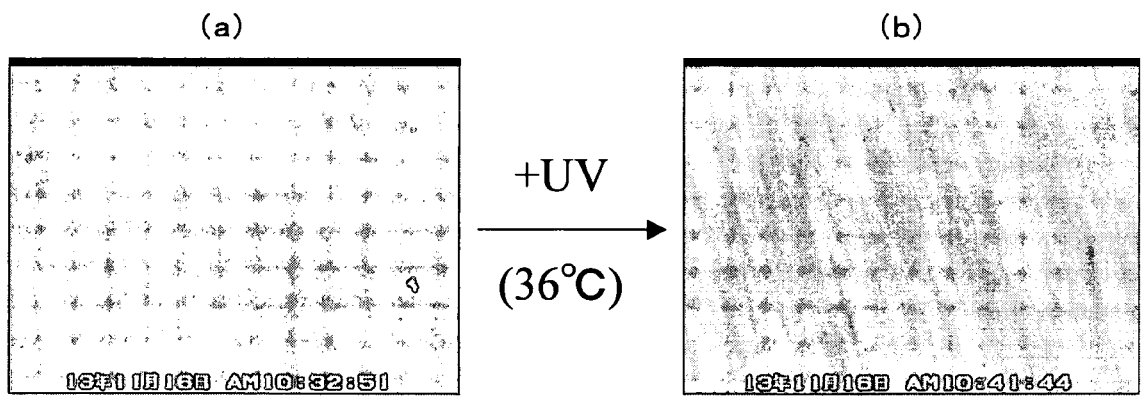
FIG. 4 shows a texture photopolymerized into a polymer by irradiating with UV light according to the present invention.

(2) FIG. 4 shows a texture of the smectic liquid crystal medium irradiated with UV rays so that it is photopolymerized into a polymer.

A medium photopolymerized into a polymer [FIG. 4(b)] is obtained by irradiating the smectic phase medium shown in FIG. 3(d) [FIG. 4(a): 36° C.] with UV.

Although, a phase separation occurs, no significant disorder of orientation is observed due to the phase separation between a liquid crystal and polymer, and thus, a uniform orientation structure is maintained. Additionally, the medium photopolymerized into a polymer [FIG. 4(b)] returns to the original phase sequence by the phase separation. Therefore, it was confirmed that a smectic phase obtained from this isotropic phase via a nematic phase directly transforms back to an isotropic phase without going through a nematic phase was confirmed.

Figure 6:
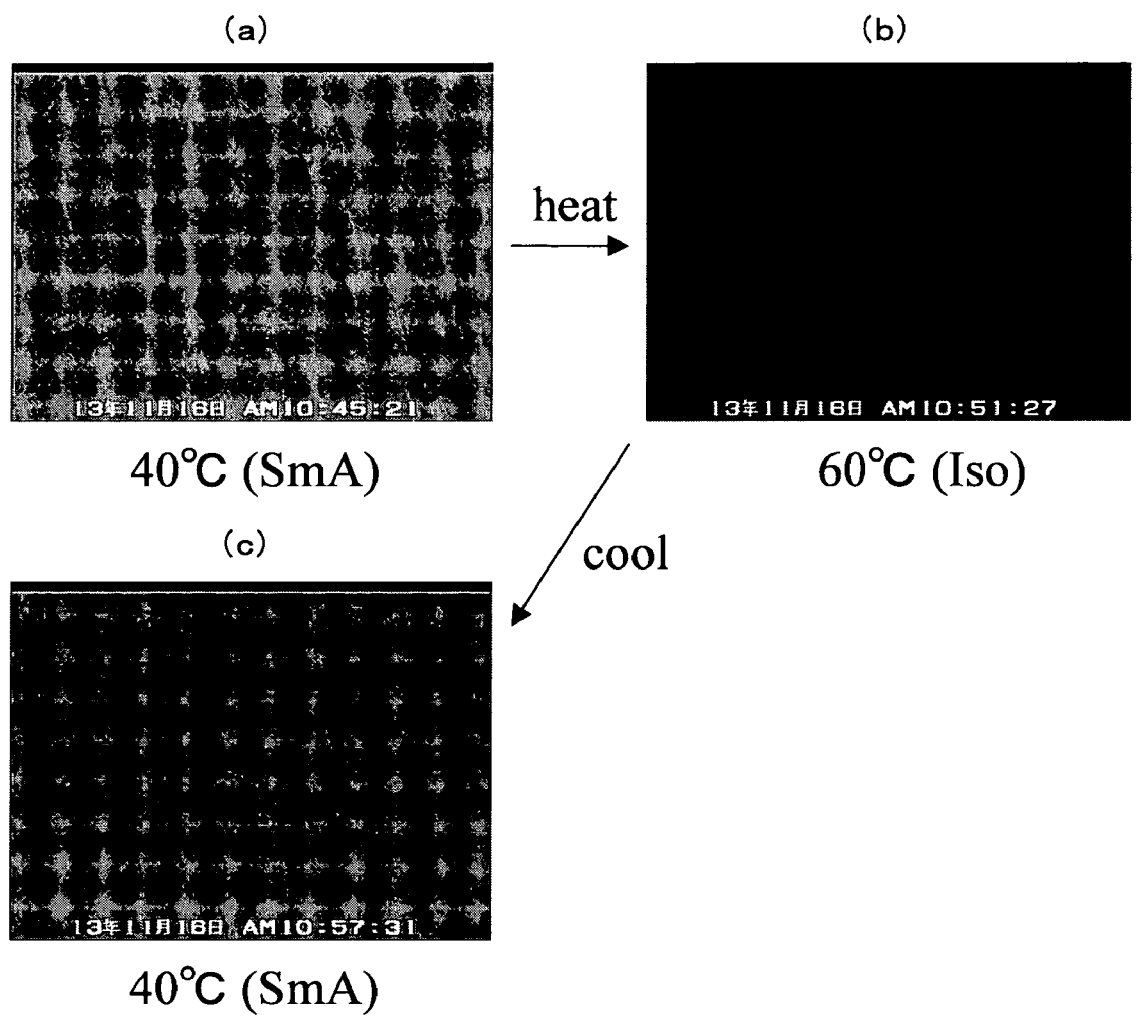
FIG. 6 shows a mode of direct transformation of an isotropic phase into a smectic phase via a nematic phase according to the present invention.

FIG. 6 shows a mode of a direct transfer from an isotropic phase obtained via a nematic phase according to the present invention directly to a smectic phase.

As shown in FIG. 6, if a smectic phase [FIG. 6(a): 40° C.] is heated to transform into an isotropic phase [FIG. 6(b): 60° C.], then, it is cooled down again, a uniform molecular orientation as shown in FIG. 6(c) is obtained via an isotropic phase [FIG. 6(b)] directly transforming into a smectic phase [FIG. 6(c): 40° C.]. This is because the formed polymer network stores the orientation structure during the photopolymerization and functions as a template. As a result, almost the same texture is obtained before and after transforming to an isotropic phase [FIG. 6(b)].

Next, focusing on the polymer template, an example where a photopolymerized monomer is added to a crystal liquid with a phase sequence of an isotropic phase-nematic phase-smectic phase, the crystal liquid is photopolymerized by irradiating with UV light, then, the liquid crystal phase separated by a medium is removed to obtain a polymer template, then, a smectic liquid crystal with no nematic phase in the phase sequence is injected into the template to obtain a uniform orientation will now be explained.

Figure 7:
FIG. 7 is a photograph of a texture polymerized by irradiating UV light in a smectic phase with uniform orientation obtained via a nematic phase according to the present invention.

The photopolymerized monomer crystal liquid in an amount of 5% by weight was added to a smectic liquid crystal FELIX-020 (Clariant) with a nematic phase in the phase sequence. A smectic phase with uniformed orientation obtained via a nematic phase was photopolymerized into a polymer by irradiating with UV light. FIG. 7 shows the photograph at that time.

As apparent from FIG. 7, no disorder of orientation based on the phase separation accompanying the polymerization was observed.

Figure 8:
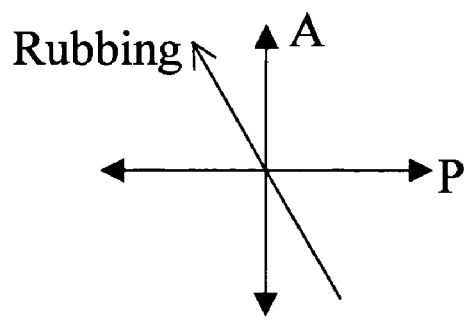
FIG. 8 is a photograph of a texture of a medium obtained by injecting a smectic liquid crystal not through a nematic phase according to the present invention into a polymer template.
Figure 8:
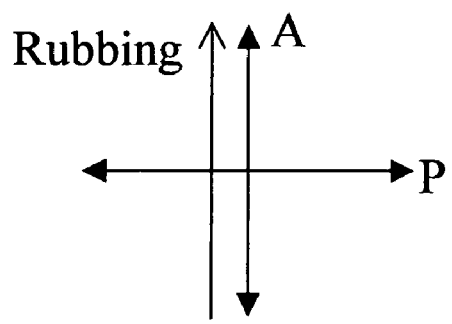
Figure 8:
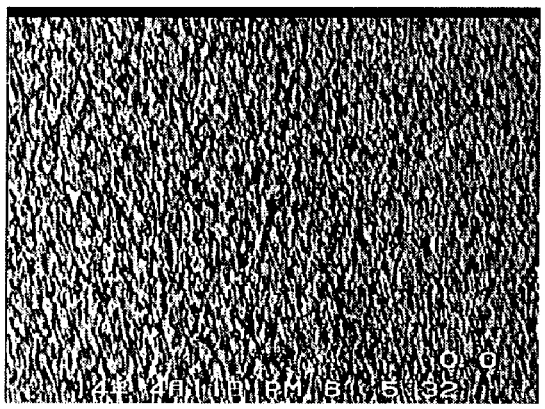
Figure 8:
Figure 8:
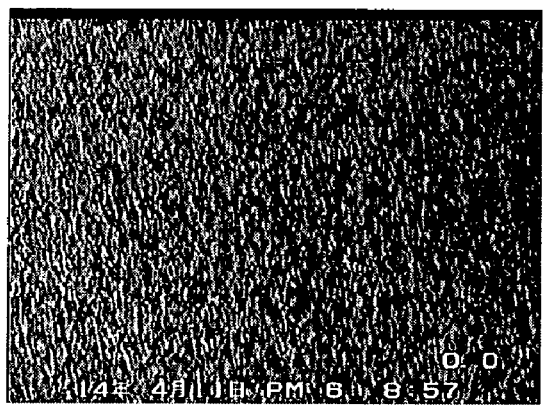
Figure 8:

Then, the smectic liquid crystal FELIX-020 was removed using acetone to obtain a polymer template. An antiferroelectric liquid crystal CS4001 (Chisso Petrochemical Corp.) was injected into the polymer template. FIG. 8 shows the photograph of the texture of the medium obtained. FIGS. 8(a) and 8(b) show a medium with uniform orientation at 75° C. FIGS. 8(c) and 8(d) show a medium with uniform orientation at 60° C.

They show no significant disorder of orientation. As a result, the dark state that is a combination of the light axis of the liquid crystal medium and the polarization axis of the Cross Nicol polarizer [FIGS. 8(b) and 8(d)] becomes a good black level with little light leakage.

While the present invention is not limited to the example shown above, a lot of variations are possible which are not excluded from the scope of the present invention.

INDUSTRIAL APPLICABILITY

A smectic liquid crystal device and process for producing the same are suitable for liquid crystal display that can display beautiful moving images.

The invention claimed is:

1. A method comprising:
   (a) inducing an isotropic phase-nematic phase-smectic phase sequence as a phase sequence of a mixture obtained by adding a photopolymerizable monomer liquid crystal exhibiting a nematic phase to a smectic liquid crystal exhibiting no nematic phase; and
   (b) irradiating the mixture with UV rays so that the monomer is photopolymerized into a polymer to thereby form a smectic liquid crystal medium with a uniform orientation structure.

2. The method according to claim 1,
   wherein the polymer functions as a template that memorizes and stabilizes the orientation structure in (b), and
   wherein a smectic liquid crystal medium with a uniform orientation structure which is completely the same as that before phase transformation, even if transformation into an isotropic phase after (b), is performed, is obtained directly from the isotropic phase.

3. A smectic liquid crystal device comprising an irradiated liquid crystal mixture manufactured by the method according to claim 1.

4. A smectic liquid crystal device comprising an irradiated liquid crystal mixture manufactured by the method according to claim 2.

5. The method according to claim 1, wherein the amount of photopolymerizable monomer liquid crystal in said mixture is less than the amount of the smectic liquid crystal exhibiting no nematic phase.

6. The method according to claim 1, wherein the amount of photopolymerizable monomer liquid crystal in said mixture is 30% by weight or less than the amount of the smectic liquid crystal exhibiting no nematic phase.

7. The method according to claim 1, wherein the mixture consists of said photopolymerizable monomer liquid crystal and said smectic liquid crystal exhibiting no nematic phase.

* * * * *